United States Patent [19]

Jaynes

[11] Patent Number: 4,995,891

[45] Date of Patent: Feb. 26, 1991

[54] SECONDARY AIR FILTER ASSEMBLY

[75] Inventor: Alan Jaynes, Ortonville, Mich.

[73] Assignee: Chrysler Corporation, Highland Park, Mich.

[21] Appl. No.: 488,204

[22] Filed: Mar. 5, 1990

[51] Int. Cl.[5] .............. B01D 51/00

[52] U.S. Cl. .............. 55/419; 55/484; 55/497; 55/510; 123/198 E; 123/573

[58] Field of Search .............. 55/419, 482, 484, 497, 55/498, 510; 123/198 E, 573

[56] References Cited

U.S. PATENT DOCUMENTS

| | | | |
|---|---|---|---|
| 1,573,656 | 2/1926 | Terhune | 55/484 |
| 3,277,876 | 10/1966 | Abts | 55/510 |
| 4,236,901 | 12/1980 | Kato et al. | 55/484 |
| 4,861,359 | 8/1989 | Tettman | 55/484 |

*Primary Examiner*—Bernard Nozick

*Attorney, Agent, or Firm*—Kenneth H. MacLean

[57] ABSTRACT

A crankcase filter assembly for filtering air in a crankcase ventilation system. The crankcase filter assembly (71) includes a crankcase filter housing disposed in an air cleaner assembly. The crankcase filter housing defines an opening in fluid communication with the air cleaner assembly and includes a first air inlet or drain hole spaced from opening and an air outlet in fluid communication with an engine crankcase. A filter cartridge supports first and second filters within the crankcase filter housing in respective first and second filter positions establishing a filter spacing therebetween. The filter cartridge interconnects the first and second filters for allowing their insertion and removable from the crankcase filter housing as a single unitary cartridge structure while maintaining the filter spacing between the first and second filters.

17 Claims, 3 Drawing Sheets

FIG. 1
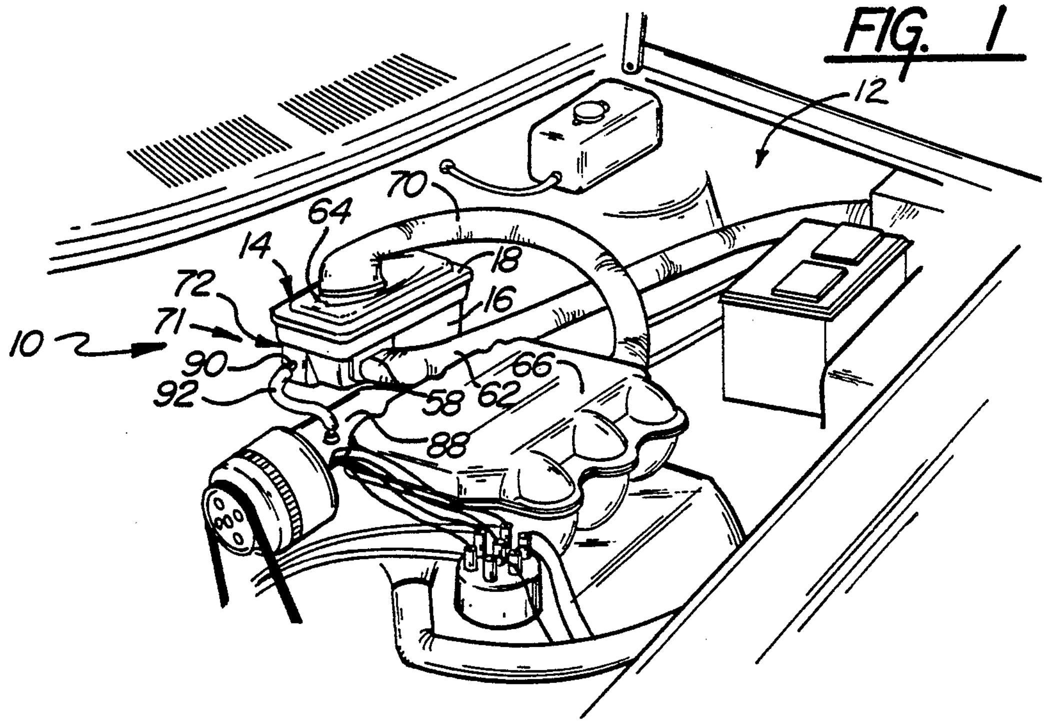
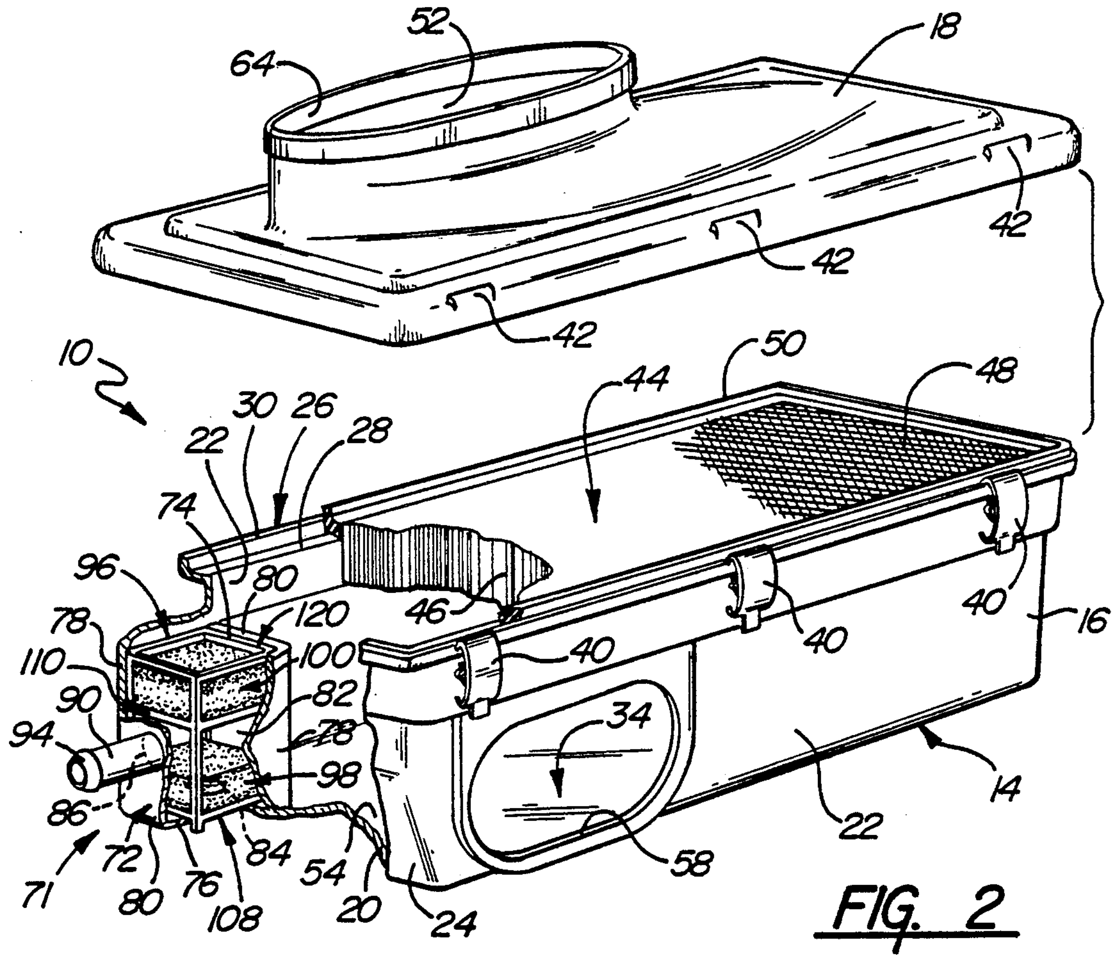
FIG. 2

SECONDARY AIR FILTER ASSEMBLY

TECHNICAL FIELD

This invention relates generally to a vehicle engine and more particularly to an engine air cleaner assembly which has a unitary secondary air filter subassembly which is part of the engine crankcase ventilating system.

BACKGROUND ART

Modern vehicle engines are commonly equipped with a positive crankcase ventilation (PCV) system which reduces emissions by passing crankcase vapors through the engine combustion process rather than discharging them to the atmosphere. In a typical PCV system, a relatively small air flow is directed from the air cleaner assembly to the engine's valve cover and then to the engine crankcase. An intake hose connects an outlet of the air cleaner with the engine. This air delivered to the engine valve cover passes into the crankcase and there mixes with the crankcase vapors. The resultant air/vapor mixture is discharged from the engine through a one-way check valve or positive crankcase vent valve into the engine's intake manifold through an outlet hose. Subsequently, the air/vapor mixture is consumed in the engine's combustion chambers and is treated by exhaust gas devices such as a catalyst converter.

As explained above, air flowing through the PCV system passes from the air cleaner, through the inlet hose, into the engine valve cover and crankcase and then discharges through the PCV valve and outlet hose to the intake manifold. When an engine is operated under a heavily loaded condition for a relatively long period, an excess of crankcase air/vapors may be generated which exceeds the capacity of the PCV valve. When this happens, the excess volume of air/vapor may be discharged from the crankcase and through the normal intake hose into the air cleaner. In cold weather and under these conditions, this reverse flow of the air/vapor mixture could result in condensation of any water vapor where the air/vapor empties into the interior of the air cleaner assembly. To prevent accumulations of water in the air cleaner, a drain hole in its lower wall is provided to allow water to escape.

Under normal engine operating conditions, air flow to the PCV system may come from two sources. The primary source is air drawn from the engine air filter assembly and through its primary air filter. A secondary source of air is through the aforesaid drain hole. Since air which may mix with oil in the crankcase must be filtered to prevent contamination of engine oil, a secondary air filter is necessary for both of these sources.

Prior to the improved unitary filter assembly of this application, filters have been used to cover the outlet connection of the PCV system to the crankcase, one for each of the above identified sources. These filters naturally would absorb any water condensation. In cold weather and under certain operating conditions, this absorbed water can freeze. When this happens, the frozen water could block air flow of the PVC system.

In previous vehicles manufactured by the assignee of this application, the two secondary filters identified above are insertably supported in a recess-like filter housing or open ended subhousing of the air cleaner housing. This subhousing is conveniently formed in one corner of the air cleaner's interior. The drain hole is formed through the bottom wall of the air cleaner housing. The recess or sub-housing is formed with an opened upper end for insertion of the filters. In assembling the filters, a small spacer member is first inserted into the sub-housing. Next, a first filter is inserted and is positioned by the spacer over the drain hole. A second spacer member is then inserted. Finally, a second filter is inserted into a position spaced above the PCV's air outlet to the engine. The use of these many pieces is undesirable from a manufacturing and assembly viewpoint.

Functionally, the above described multi-piece filter arrangement is quite effective in filtering air and preventing freezing of the lower filter. After a period of use, the filters become dirty and should be replaced. With the above described multi-piece arrangement, replacement of the individual filters and insertion of spacer members is inconvenient and time consuming. Since the parts are disposed within the confines of the small housing, the assembly is also difficult. The lowest filter is particularly difficult to replace. Another concern is that the first spacer, first filter, second spacer and second filter may be reinstalled incorrectly into the housing or in an improper order. This is of concern since an engine which is operated without proper PCV air filtration can produce excessive emissions.

SUMMARY OF THE INVENTION AND ADVANTAGES

According to the present invention, the former multi-piece filter and spacer arrangement is replaced by a unitary secondary filter assembly. As before, this assembly is supported in a recess or subhousing within the air cleaner housing. The filter subhousing also has a drain opening in the bottom wall. An air outlet or PCV air supply is located between the open end of the subhousing and the drain hole. The air outlet is in fluid communication with an engine crankcase. A unitary cartridge structure supports first and second filters within the filter housing and provides necessary spacing of the filters relative to the drain hole and the air outlet.

The first filter is positioned in a first filter position spaced above the drain hole and spaced downwardly from the air outlet. The second filter is positioned in a second filter position spaced above the air outlet and spaced below the open end of the subhousing. This defines a flow space between the first and second filters. The unitary cartridge means effectively arranges the first and second filters into a single unit to allow easy first assembly, removal and replacement of the filters. Proper filter spacing is insured.

Accordingly, the subject invention effectively connects the first and second filters to permit their easy removal and insertion with respect to the subhousing. The filter cartridge also assures proper installation of the first and second filters within the subhousing. Thus, the filter cartridge supports the filters as a single unitary structure assuring proper positioning in the subhousing. This avoids the possibility of misarranging the first and second filters and spacers in such a manner that would decrease the filtering efficiency or cause a flow stoppage due to condensation freezing.

FIGURES IN THE DRAWINGS

Other advantages of the present invention will be readily appreciated as the same becomes better understood by reference to the following detailed description when considered in connection with the accompanying drawings wherein:

FIG. 1 is a fragmentary perspective view of a preferred embodiment of the subject invention disposed in combination with an automotive engine;

FIG. 2 is a perspective view of the preferred embodiment shown partially cut away and in cross section;

DESCRIPTION OF THE PREFERRED EMBODIMENT

Figure 4:
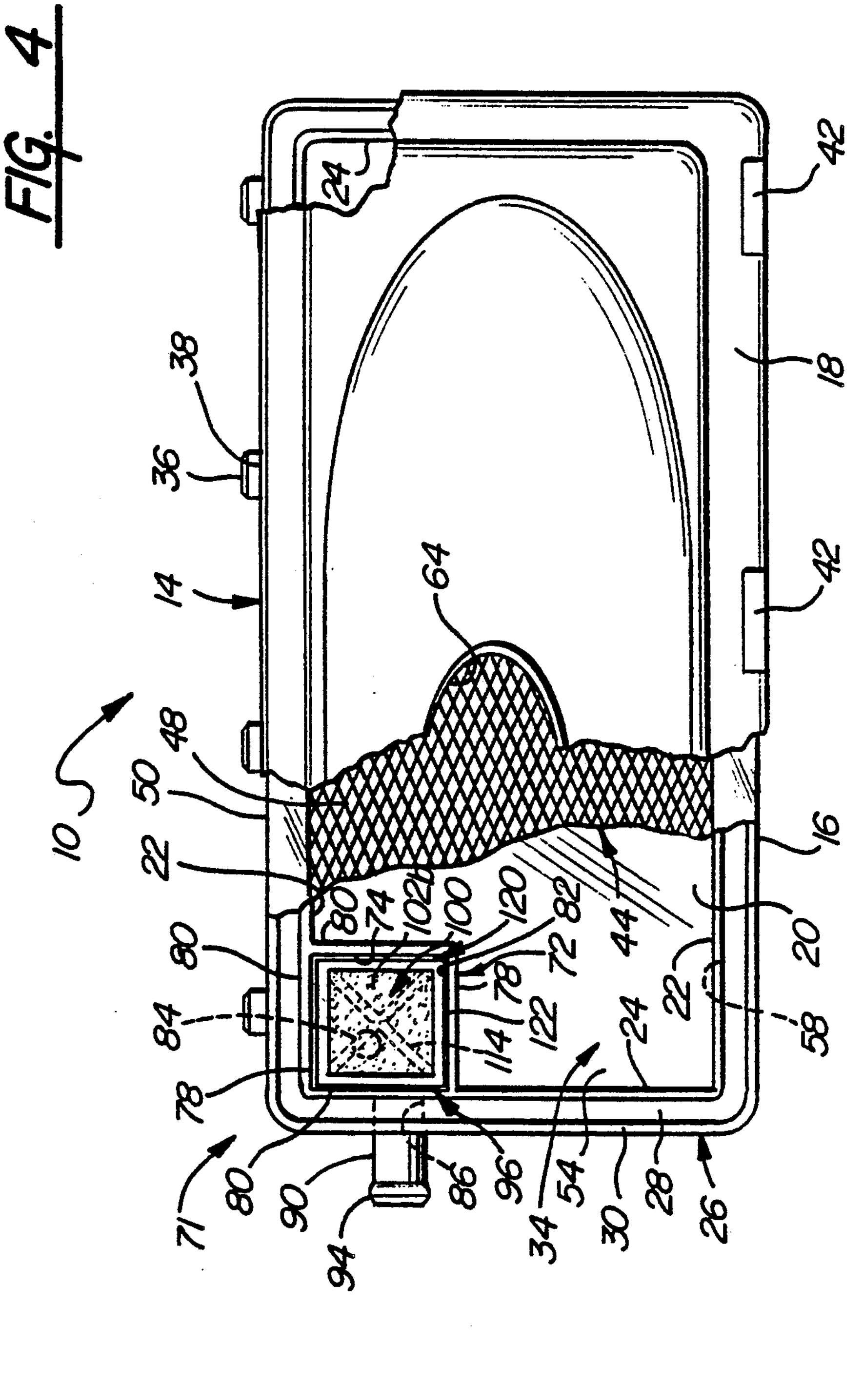
FIG. 4 is a plan view of the subject invention shown partially broken away.
Figure 3:
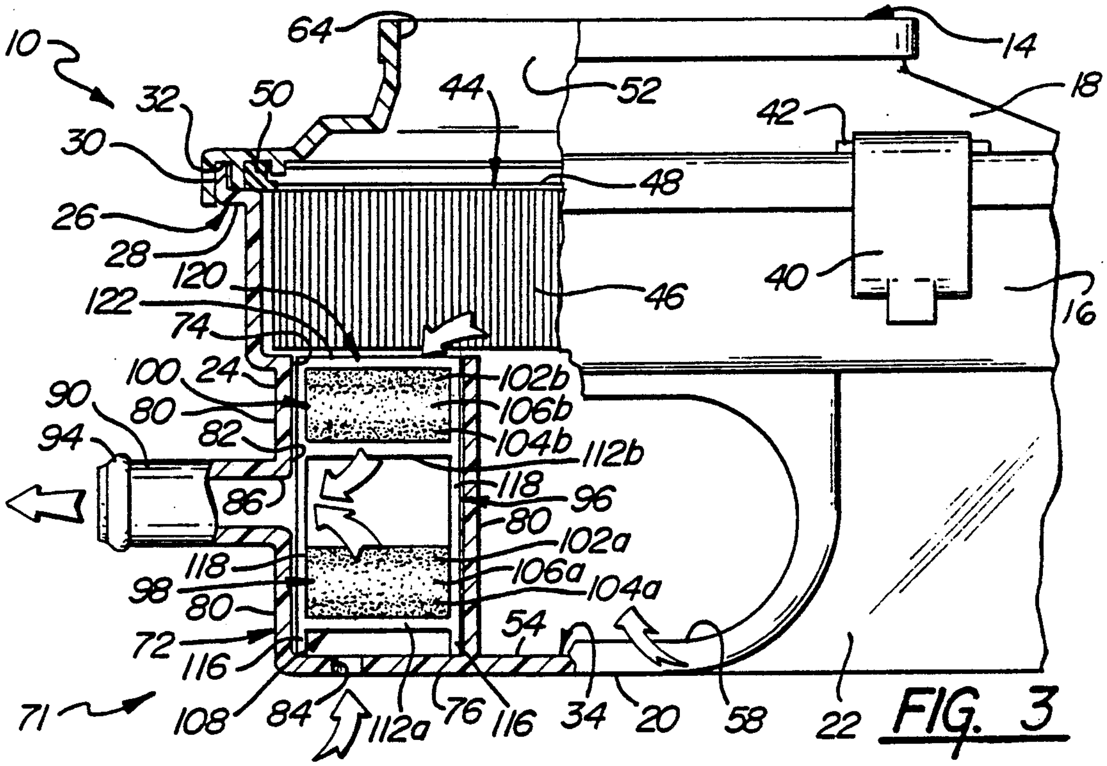
FIG. 3 is a fragmentary side elevational view of the preferred embodiment shown partially broken away and in cross section.
Figure 5:
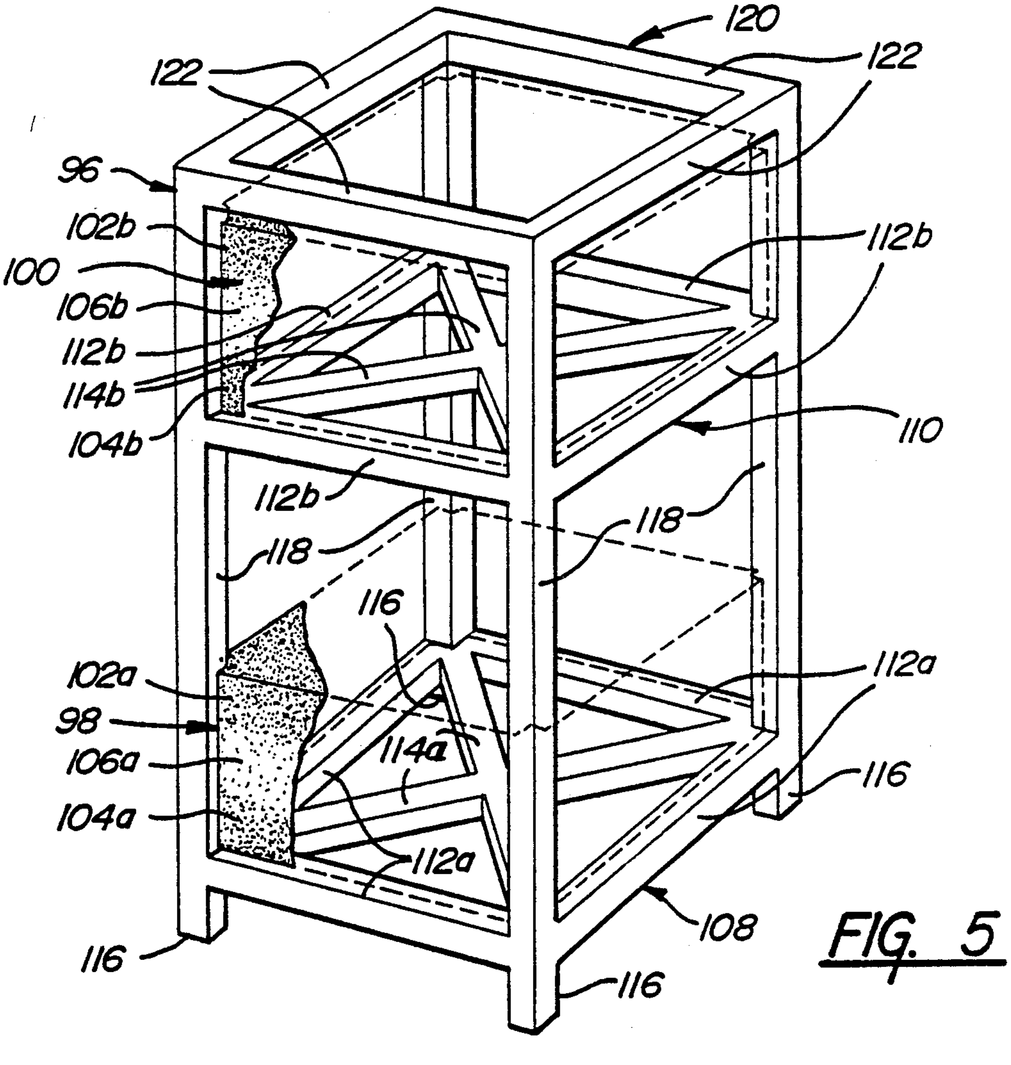
FIG. 5 is an enlarged perspective view of the filter cartridge.

An air cleaner assembly for a vehicle engine as constructed in accordance with the subject invention is generally shown at 10 in FIG. 1. This is as air cleaner 10 might appear installed in the engine compartment of a vehicle 12. As best shown in FIGS. 2 through 4, the air cleaner assembly 10 includes an air cleaner housing generally indicated a 14. Housing 14 has a lower box-like half housing 16 and an oppositely disposed upper half housing 18. The half housings 16, 18 are adapted to be joined together to form an interior or chamber generally indicated at 34 therewithin. The lower housing 16 includes bottom wall 20 and oppositely disposed side 22 and end 24 walls. A lip, generally indicated at 26, is formed along the top of each of the side 22 and end 24 walls and includes a base portion 28 extending perpendicularly outwardly from the walls 22, 24 and a male engaging portion 30 extending perpendicularly upwardly from the base portion 28.

As best shown in FIG. 3, the upper housing 18 has an outer U-shaped channel 32 for mating engagement with the lip 26 of the lower housing 16. The lower housing 16 includes blade-like tabs or projections 36 as in FIG. 4. The tabs 36 have a generally rectangular-shaped cross section and extend perpendicularly outwardly from the male engaging portion 30 of one of the side walls 22. The tabs extend through corresponding apertures 38 in the peripheral edge of the upper housing 18. The lower housing 16 further includes a plurality of latches 40 disposed on a side wall 22 opposite the wall having tabs 36. As best seen in FIGS. 3 and 4, the latches 40 engage a plurality of corresponding peaked projections 42 which are formed on the peripheral edge of the upper housing 18 opposite the apertures 38. Thus, the tabs 36 and latches 40 engage the apertures 38 and projections 42 respectively to form a means to removably securing the upper housing 18 to the lower housing 16.

A generally flat air cleaner filter, indicated at 44 includes filter material formed into a series of uniformly spaced pleats 46 to achieve optimum filter surface area, as is well known in the art. Adjacent and overlying the uniformly spaced pleats 46 there is provided a flexible wire mesh screen 48. A cellular foam seal 50 is molded about the periphery of the screen 48. Seal 50 joins the screen 48 with the pleats 46 to form a compact and efficient air cleaner filter 44. The air cleaner filter 44 is interposed between the upper 18 and lower 16 housings and divides the chamber 34 into and upper filtered air portion 52 and a lower unfiltered air portion 54. The seal 50 of the air cleaner 44 mates with the base portion 28 of housing 16 and the upper housing half 18 to effect a water-tight, air impermeable seal between the upper 18 and lower 16 housings.

The air cleaner housing 14 includes an air intake passage 58 disposed in a side wall 22 of the lower housing 16 for admitting atmospheric air into the lower unfiltered air portion 54 of chamber 34. The air intake passage 58 has a generally oval shape for engagement with a hose assembly 62 as seen in FIG. 1. Atmospheric air is drawn in through the hose assembly 62 and directed to air intake passage 58. The air cleaner housing 14 further includes an air outlet passage 64 formed in the upper housing 18 and is in communication with the upper filtered air portion 52 of the chamber 34. Atmospheric air which is drawn in through the air intake passage 58 passes through and is filtered by the air cleaner filter 44 where it is subsequently discharged through the air outlet passage 64. In other words, the air cleaner filter 44 separates the air outlet passage 64 from the air intake passage 58, thus defining the upper filtered portion 52 on one side of the air cleaner filter 44 adjacent the air outlet passage 64 and the lower unfiltered portion 54 on the other side of the air cleaner filter 44 adjacent the air intake passage 58. In this manner, all air discharged through air outlet passage 64 passes through and is filtered by the air cleaner filter 44. The air outlet passage 64 discharges air to a fuel delivery system 66 of an internal combustion engine, such as a carburetor or a fuel injection system, for combination with a proper amount of fuel for combustion in the engine. The air outlet passage 64 is elliptical in shape for engagement with a hose assembly 70 in fluid communication with the fuel delivery system 66. Thus, filtered air which is discharged through the air outlet passage 64 is delivered to the fuel delivery system 66 via the hose assembly 70.

The filter assembly 10 includes a crankcase filter assembly generally shown at 71. The filter assembly 71 comprises a crankcase filter housing or air cleaner sub-housing generally indicated at 72 in FIGS. 2, 3 and 4. The housing 72 is recess-like with an opened upper end opening 74 to insertably receive a crankcase filter assembly. More specifically, the housing 72 comprises a bottom wall 76 which it shares with the air cleaner housing. Preferably, the filter housing 72 is formed in the corner of the lower housing 16 and within its interior 34. Thus, filter housing 72 is actually a sub-housing in the preferred embodiment shown in the drawings. Two adjacent walls 22, 24 of the housing 16 form part of the filter sub-housing and two additional interior walls 78, 80 complete the filter sub-housing. Preferably, the sub-housing 72 has a generally rectangular configuration. The walls 78 and 80 are joined perpendicularly along their respective lengths establishing a square-shaped periphery. The bottom wall portion 76 is correspondingly square-shaped and secured to the end 80 and side 78 walls forming a tetragonally shaped (i.e., an elongated cube) secondary filter chamber 82 therewithin. Although the foregoing is a preferable configuration of the filter sub-housing 72, it will be understood that other configurations and shapes may be used without departing from the spirit of the invention.

In the illustrated filter housing configuration, the open end 74 is located oppositely bottom wall 76. The opening 74 is in fluid communication with the interior of the air cleaner. Preferably, the edge portion of the subhousing which defines opening 74 abuts the bottom surface of the filter 44 so that air entering the opening 74 must first pass through the main filter. Otherwise, dirty air drawn adjacent the lower "dirty" side or surface of the filter 44 could enter opening 74.

The filter sub-housing 72 further includes a first air inlet opening 84 or water drain hole which is spaced oppositely from the opening 74 in the bottom wall 76. An air outlet opening 86 is positioned between the upper opening 74 and the lower drain opening 84 and is in fluid communication with the interior of an engine valve cover 88 shown in FIG. 1. The interior of the valve cover 88 fluidly communicates with the engine crankcase as is conventional. Air outlet 86 includes a male tubular connector member or fitting 90 formed integrally with the end wall of the air cleaner. It extends perpendicularly outwardly therefrom for convenient attachment to a hose 92 (in FIG. 1). Hose 92 completes the communication with the engine valve cover 88. An annular bead or ridge 94 is formed on the extended end of the fitting 90 to maintain a positive connection with the hose 92.

The first air inlet or drain hole 84 is formed in the bottom wall 76 opposite the opening 74 and is in fluid communication with atmosphere. Thus, air may be drawn into the filter chamber 82 both through opening 74 and through drain hole 84. The air then passes through air outlet 86 and is communicated to the engine crankcase 88 through the hose 92. This air passing into the valve cover 88 and the engine crankcase serves to ventilate the crankcase as part of a positive crankcase ventilation (PCV) system of the internal combustion engine. Once the air enters the interior of the engine, it mixes with the crankcase vapors and is discharged to the engine's intake manifold. As in prior engine PCV systems, the air/vapor mixture passes first through a one-way flow type PCV valve (not shown), and then through a discharge hose (not shown) to the engine intake manifold (not shown) where the crankcase vapors are combusted.

A problem may arise, however, if the PCV valve does not pass sufficient quantities of air/vapor to the manifold. This might occur, for example, if the generation of crankcase vapors exceeds the capacity of the one-way PCV valve. Although such a situation is unusual, the resultant rise in crankcase pressure causes crankcase air/vapor to flow out of the engine valve cover 88. This reverse flow passes through hose 92, air outlet 86 and into the filter chamber 82. When this reverse flow occurs, there is a possibility that crankcase air/vapors containing water vapor might result in condensation of water in hose 92. This condensation might be introduced into the filter sub-housing 72 through air outlet 86. Accordingly, the first air inlet or drain hole 84 is provided to allow water to escape from the filter sub-housing 72. Thus, even with an unusual reverse flow, crankcase air/vapors are drawn into the air cleaner through opening 74 and directed to the engine for combustion rather than discharged into the atmosphere.

In a preferred embodiment, the crankcase filter subhousing 72 is disposed in the interior of the air cleaner housing 14 and the opening 74 is in fluid communication with the filtered air portion 52 of the air cleaner through the filter 44. More specifically, the crankcase filter housing 72 is disposed in a corner of the lower housing 16 with the end wall 80 having the male tubular connector member 90 being formed as part of one of the end walls 24 of the lower housing half 16. In similar manner, one of the adjacent side walls 78 of the crankcase filter housing 72 is formed as part of the side wall 22 of the lower housing half 16. The other side 78 and end 80 walls are formed as partitions extending inwardly from the side 22 and end 24 walls of the lower housing 16 separating the filter chamber 82 from the remaining lower unfiltered air portion 54. Thus, under normal operation, a portion of the filtered atmospheric air in chamber 52 is admitted through air opening 74 and thereafter discharged through air outlet 86 as best shown in FIG. 3 by arrows. Additionally, air drawn into the filter chamber 82 through the drain hole 84 is discharged through air outlet 86.

A unique filter cartridge means is generally indicated at 96 in FIGS. 2 through 5. The cartridge 96 supports first 98 and second 100 air filters within the crankcase filter subhousing 72. The first filter 98 is supported in a first filter position interposed between the first air inlet or drain hole 84 and the air outlet 86. Filter 98 overlies but is spaced upwardly from the drain hole 84. The second filter 100 is supported in a second filter position interposed between the opening 74 and the air outlet 86. The second filter 100 is spaced upwardly from the air outlet 86 and the first filter 98 to define a space between the first 98 and second 100 filters. The filter cartridge means 96 integrally connects the first 98 and second 100 filters into a unitary structure to easily permit insertion and removal of the secondary filter assembly from the sub-housing 72. Thus, the assembly acts as a single structure to maintain the proper positioning of the filters and the spacing therebetween.

The first 98 and second 100 filters are fabricated of an expanded organic polymeric material having upper 102a, 102b and lower 104a, 104b portions, respectively. They are comprised of bonded expanded organic polymeric material separated by middle portions 106a, 106b of unbonded expanded organic polymeric material. In other words, the first 98 and second 100 filters comprise an air permeable network of interlocking fibers having upper 102a, 102b and lower 104a, 104b portions in which the fibers are bonded or fused for giving integrity to the filter material separated by an unbonded or unfused middle portions 106a, 106b. This filter type allows for the passage of moisture or condensation without greatly inhibiting the air filtering qualities. The first 98 and second 100 filters have predetermined cross-sectional shapes generally conforming to the peripheral shape of the opening 74. Thus, in the preferred embodiment, the first 98 and second 100 filters have a cross-sectional shape in the form of a square with four equal length sides. Additionally, the first 98 and second 100 filters have a predetermined thickness equal to about one third of the length of the sides.

The filter cartridge means 96 includes a first air permeable filter platform generally indicated at 108 having a peripheral shape generally conforming to the cross-sectional shape of the first filter 98 and is disposed adjacent thereto for supporting the first filter 98 in the first filter position. The filter cartridge means 96 further includes a second air permeable filter platform generally indicated at 110 having a peripheral shape generally conforming to the cross-sectional shape of the second filter 100 and disposed adjacent thereto for supporting the second filter 100 in the second filter position. Thus, in the preferred embodiment the first 108 and second 110 filter platforms have identical square-shaped peripheral shapes generally conforming to the square cross-sectional shape of the first 98 and second 100 filters. Each of the first 108 and second 110 filter platforms 10 includes four interconnected peripheral members 112a, 112b respectively forming identical square-shaped peripheries having four equal sides and four corners. Each of the first 108 and second 110 platforms further includes intersecting cross members 114*a*, 114*b* respectively extending diagonally across each of the peripheries between their respective corners. The first 108 and second 110 filter platforms are disposed in parallel planes and spaced a predetermined distance from one another to establish the proper filter spacing between the first 98 and second 100 filters and for supporting the first 98 and second 100 filters in their respective first and second filter positions.

In the first filter position, the first filter 98 is positioned between the first air inlet or drain hole 84 and the air outlet 86 for filtering the air which is drawn in through drain hole 84 and discharged through air outlet 86. The first filter platform 108 includes leg members 116 depending from each of the corners thereof a predetermined extended distance for supporting the first filter 98 off the bottom wall 76 of the crankcase filter subhousing 72, thus spacing the first filter 98 upwards from the drain hole 84. The first filter 98 is also spaced from the air outlet 86 such that the first filter 98 is positioned intermediate the drain hole 84 and the air outlet 86. Spacing the first filter 98 from the drain hole 84 and air outlet 86 provides a low restriction to air flowing therethrough. Additionally, by spacing the first filter from the drain hole 84, a larger air filter surface is presented to the air entering drain hole 84 resulting in an a more efficient filtration of the air passing through air outlet 86 from drain hole 84, and thus an efficient use of first filter 98. Also, spacing the first filter 98 from drain hole 84 prevents blockage of the drain hole 84 caused by condensation that freezes in a filter positioned directly over a drain hole.

The second filter platform 110 supports the second filter 100 in the second filter position between the opening 74 and the air outlet 86 for filtering the air entering through the opening 74 and discharged through air outlet 86. The second filter platform 110 also supports the second filter 100 spaced from the air outlet 86 and opposite and spaced from the first filter 98, establishing the filter spacing therebetween. Thus, the filters 100, 98 are positioned above and below the air outlet 86 such that if a line is drawn from the air outlet 86 perpendicularly toward the opposite end wall 80, the line would intersect the opposite end wall 80 without passing through either of the first 98 or second 100 filters.

Vertical support columns 118 interconnect the corners of the first 108 and second 110 filter platforms. Thus, the first filter 98 is captured between the first 108 and second 110 platforms and within the bounds of the vertical support columns 118. The lower leg members 116 are preferably formed as a continuation of the vertical support columns 118 to space the filter 98 above the bottom wall 76 and drain hole 84.

The filter cartridge means 96 further includes a filter retainer generally indicated at 120 having a peripheral shape generally conforming to the peripheral shape of the first 108 and second 110 filter platforms and disposed adjacent the second filter 100 oppositely of and spaced a predetermined distance from the second filter platform 110. More specifically, the filter retainer 120 includes four interconnected peripheral members 122 having equal lengths and forming a square-shaped periphery having four equal sides and four corners and identical in shape to the square-shaped peripheries of the first 108 and second 110 filter platforms. The filter retainer 120 is disposed above the second filter 100 opposite the second filter platform 110 and disposed in a plane parallel to and spaced from the parallel planes of the first 108 and second 110 filter platforms with the vertical support columns 118 interconnecting the corners of the filter retainer 120 and the second filter platform 110. In this manner, the second filter 100 is captured between the second filter platform 110 and the filter retainer 120 and within the bounds of the vertical support columns 118. The first 98 and second 100 filters are preferably oversized such that the vertical support columns 118 gently compress and positively retain the first 98 and second 100 filters therewithin and the filters 98,100 engage the crankcase filter housing 72 to assure filtration of all air discharged through air outlet 86 by the filters 98,100. The spacing between the filter retainer 120 and the second filter platform 110 is greater than the extended distance of the leg members 116 and less than the spacing in between the first 108 and second 110 filter platforms.

The filter cartridge means 96, therefore, provides a means for supporting first 98 and second 100 filters in their respective first and second filter positions within the crankcase filter housing 72 and provides a means for integrally connecting the first 98 and second 100 filters for allowing their insertion and removal from the crankcase filter housing 72 as a single unitary cartridge structure while maintaining their relative fixed positions and filter spacing. In this manner, when it becomes necessary to change the crankcase filter, the first 98 and second 100 filters are removable as a single cartridge structure. The open lattice type structure of the preferred embodiment allows for easy removal and replacement of the first 98 and second 100 filters or, alternatively, the entire filter cartridge assembly may be disposed of and a new one provided. The unitary cartridge structure further assures proper positioning of the first 98 and second 100 filters within the crankcase filter housing 72.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A filter assembly for filtering air of a crankcase ventilating system of an internal combustion engine, said assembly comprising:

a crankcase filter housing (72) defining an opening (74) to receive a crankcase filter in fluid communication with an air cleaner and having a first air inlet (84) spaced from said opening (74), said crankcase filter housing (72) having an air outlet (86) between said opening (74) and said first air inlet (84) in fluid communication with an engine crankcase;

including filter cartridge means (96) supporting first (98) and second (100) filters within said crankcase filter housing (72), said first filter (98) being supported in a first filter position interposed between and spaced from said first air inlet (84) and said air outlet (86), said second filter (100) being supported in a second filter position interposed between said opening (74) and said air outlet (86) and spaced from said air outlet (86) an said first filter (98) to define a filter spacing between said first (98) and said second (100) filters, said filter cartridge means (96) integrally connecting said first (98) and said second (100) filters for allowing their insertion and removal from said crankcase filter housing (72) as a single unitary cartridge structure while maintaining said filter spacing.

2. An assembly as set forth in claim 1 wherein said first filter (98) has a first predetermined cross-sectional shape, said filter cartridge means (96) including a first air permeable filter platform (108) having a peripheral shape generally conforming to said cross-sectional shape of said first filter (98) and disposed adjacent thereto for supporting said first filter (98) in said first filter position.

3. An assembly as set forth in claim 2 wherein said second filter (100) has a second predetermined cross-sectional shape, said filter cartridge means (96) including a second air permeable filter platform (110) having a peripheral shape generally conforming to said cross-sectional shape of said second filter (100) and disposed adjacent thereto for supporting said second filter (100) in said second filter position.

4. An assembly as set forth in claim 3 including an air cleaner housing (14) having an air intake passage (58) in communication with said opening (74), and said crankcase filter housing (72) being disposed in said air cleaner housing.

5. An assembly as set forth in claim 4 said peripheral shapes of said first (108) and said second (110) filter platforms being identical.

6. An assembly as set forth in claim 5 said first (108) and said second (110) filter platforms being disposed in parallel spaced planes.

7. An assembly as set forth in claim 6 said filter cartridge means (96) including support columns (118) interconnecting said first (108) and said second (110) filter platforms.

8. An assembly as set forth in claim 7 said filter cartridge means (96) including leg members (116) extending a predetermined extended distance from said first filter platform (108) opposite said first filter (98).

9. An assembly as set forth in claim 8 said leg members (116) being a continuation of said support columns (118).

10. An assembly as set forth in claim 9 said filter cartridge means (96) including a filter retainer (120) having a peripheral shape generally conforming to said peripheral shape of said first (108) and said second (110) filter platforms and disposed adjacent said second filter (100) oppositely of and spaced a predetermined distance from said second filter platform (110).

11. An assembly as set forth in claim 10 said support columns (118) interconnecting said second filter platform (110) and said filter retainer (120).

12. An assembly as set forth in claim 11 said spacing between said filter retainer (120) and said second filter platform (110) being greater than said extended distance of said leg members (116) and less than said spacing between said first (108) and said second (110) filter platforms.

13. An assembly as set forth in claim 12 said peripheral shape of said first (108) and said second (110) filter platforms being a square with four equal sides and four corners.

14. An assembly as set forth in claim 13 each of said first (108) and said second (110) filter platforms including cross members (114) extending diagonally between said corners of said peripheries.

15. An assembly as set forth in claim 14 said first (98) and said second (100) filters being fabricated of an expanded organic polymeric material.

16. An assembly as set forth in claim 15 said first (98) and said second (100) filters comprising upper (102) and lower (104) portions of bonded expanded organic polymeric material separated by a middle portion of non-bonded expanded organic polymeric material.

17. A filter cartridge assembly used for filtering air of a crankcase ventilating system of an internal combustion engine, said assembly comprising:

first (108) and second (110) air permeable filter platforms supporting first (98) and second (100) filters respectively, each of said first (108) and said second (110) filter platforms including four interconnected peripheral members (112) forming identical square-shaped peripheries having four equal sides and four corners, each of said first (108) and said second (110) filter platforms including intersecting cross members (114) extending diagonally across each of said peripheries between said corners, said first (108) and said second (110) filter platforms being disposed in parallel planes spaced a predetermined distance from one another to establish a filter spacing between said first (98) and said second (100) filters;

vertical support columns (118) interconnecting said corners of said first (108) and said second (110) filter platforms;

leg members (116) formed as a continuation of said vertical support members (118) extending from each of said corners of said first (108) filter platform a predetermined extended distance in a direction opposite said first filter (98);

a filter retainer (120) including four peripheral members (122) equal in length forming a square-shaped periphery having four equal sides and four corners identical in shape to said peripheries of said first (108) and said second (110) filter platforms, said filter retainer (120) being disposed in a horizontal plane above said second filter (100) opposite and spaced from said second filter platform (110), said vertical support columns (118) interconnecting said corners of said filter retainer (120) and said second filter platform (110), said spacing between said filter retainer (120) and said second filter platform (110) being greater than said extended distance of said leg members (116) and less than said spacing between said first (108) and said second (110) filter platforms.

* * * * *